US006813348B1

United States Patent
Stillman et al.

(10) Patent No.: US 6,813,348 B1
(45) Date of Patent: Nov. 2, 2004

(54) METHOD AND SYSTEM OF CALL ORIGINATION USING A SERVICE CIRCUIT NODE IN AN ADVANCED INTELLIGENT NETWORK

(75) Inventors: Scott T. Stillman, Peachtree City, GA (US); Scott C. Holt, Decatur, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 218 days.

(21) Appl. No.: 10/029,549

(22) Filed: Dec. 21, 2001

Related U.S. Application Data

(60) Provisional application No. 60/317,723, filed on Sep. 6, 2001.

(51) Int. Cl.[7] .................................................. H04M 7/00
(52) U.S. Cl. ............................ 379/221.08; 379/221.11
(58) Field of Search .......................... 379/15.01, 15.02, 379/221.08, 88.01, 88.03, 114.23, 114.05, 389

(56) References Cited

U.S. PATENT DOCUMENTS

| | | | |
|---|---|---|---|
| 5,325,421 A | * 6/1994 | Hou et al. | ................ 379/88.03 |
| 5,430,719 A | * 7/1995 | Weisser, Jr. | ................... 370/389 |
| 5,732,130 A | * 3/1998 | Iapalucci et al. | ....... 379/221.12 |
| 5,740,237 A | 4/1998 | Malik et al. | |
| 5,974,131 A | 10/1999 | Malik | |
| 5,991,377 A | * 11/1999 | Malik | ..................... 379/114.05 |
| 6,005,889 A | 12/1999 | Chung et al. | |
| 6,018,574 A | 1/2000 | Malik | |
| 6,023,505 A | 2/2000 | Moquin | |
| 6,067,347 A | * 5/2000 | Farris et al. | .............. 379/88.01 |
| 6,453,031 B2 | * 9/2002 | Malik | ..................... 379/114.23 |

* cited by examiner

Primary Examiner—Ahmad F. Matah
Assistant Examiner—Rasha S. Al-Aubaidi
(74) Attorney, Agent, or Firm—Merchant & Gould

(57) ABSTRACT

A system and method of call origination on behalf of a subscriber using a service circuit node (SCN) in an Advanced Intelligent Network (AIN). An SCN provides assistance in the origination of a call on behalf of a subscriber. Upon completion of the assistance provided by the SCN, the SCN will attempt to originate a call to a third party on behalf of the subscriber. This invention preserves subscriber preferences for certain attributes including interexchange carrier (IXC) and billing information, without the need for data replication within either the SCN or the service switching point (SSP) hosting the SCN.

20 Claims, 3 Drawing Sheets

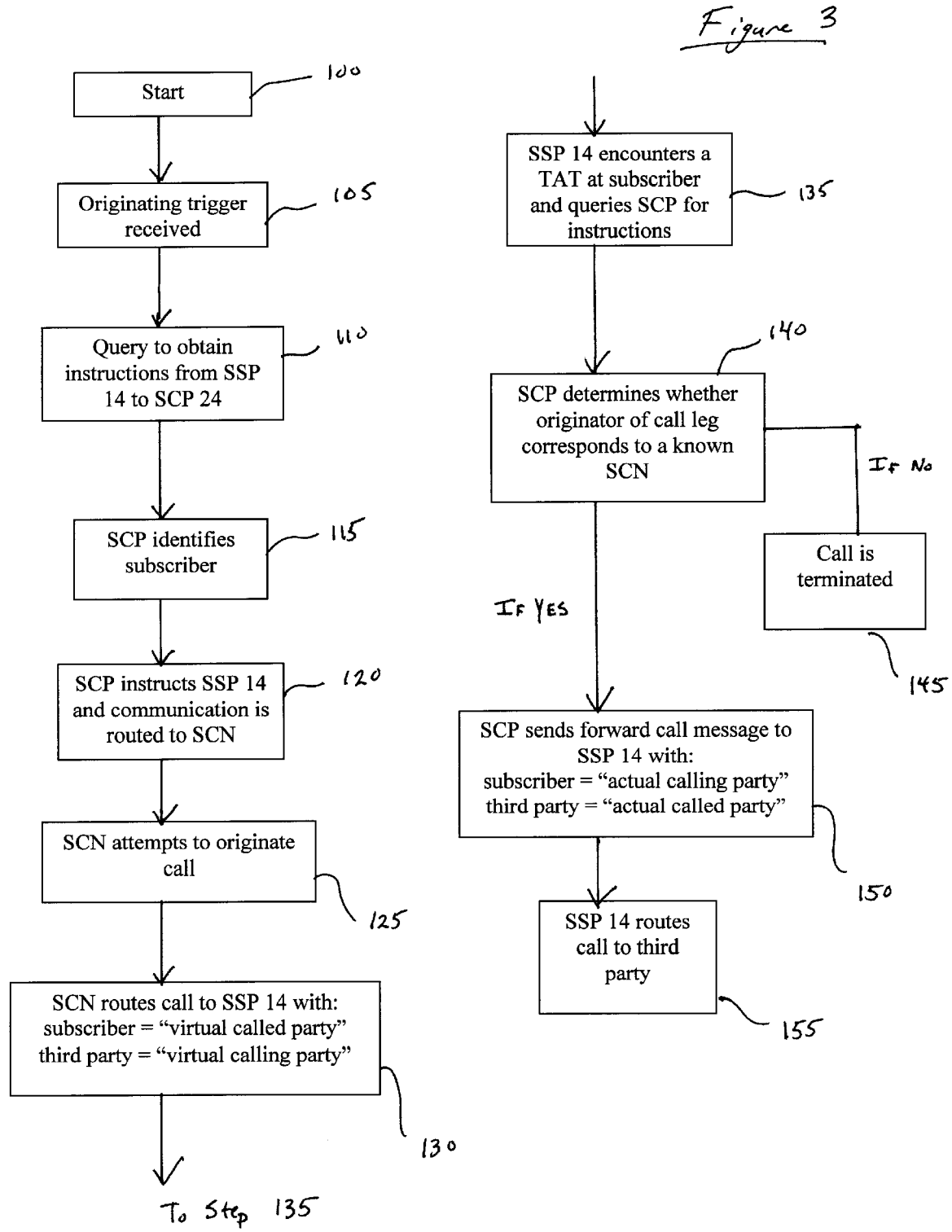

METHOD AND SYSTEM OF CALL ORIGINATION USING A SERVICE CIRCUIT NODE IN AN ADVANCED INTELLIGENT NETWORK

This application claims the benefit of U.S. Provisional Application No. 60/317,723 filed Sep. 6, 2001, which document is incorporated herein by reference.

FIELD OF THE INVENTION

The invention generally relates to the field of telecommunications. The invention particularly relates to a method and system of call origination utilizing a service circuit node (SCN) in an Advanced Intelligent Network (AIN).

BACKGROUND OF THE INVENTION

As the world of telecommunications becomes increasingly more sophisticated, society reaps the benefits through new, improved, and/or enhanced telecommunication services, as well as more service choices. These enhanced telecommunication services include, for example, originating call screening, flexible call forwarding (FCF), audio name screening, deluxe calling name delivery, and voice activated dialing (VAD). These enhanced telecommunication services are available to a user of a modem public switched telephone network (PSTN) and are considered valuable services by many subscribers because they enhance conventional telephone service.

As an example, when VAD service is activated by a subscriber or customer, the VAD service prompts the subscriber to utter a word, phrase, or term and translates that speech into a destination calling line number that corresponds to the desired called party. Typically, the subscriber must activate the VAD service by entering a feature code or dialing a feature directory number. Once the speech recognition is performed, an outbound call is placed through the PSTN, which bridges the call between the subscriber and the called party. However, bridging the call in such a manner does not preserve subscriber billing and interexchange carrier preferences (IXC).

The freedom to choose among a variety of interexchange carriers (IXCs) has become an important aspect of modem telephone service. An IXC is a telephone company that provides connections between local exchanges in different geographic areas. IXCs are commonly referred to as "long-distance carriers" and include AT&T, MCI, Sprint, and others. IXCs provide interLATA service as described in the Telecommunications Act of 1996. LATA (local access and transport area) is a term in the U.S. for a geographic area covered by one or more local telephone companies, which are referred to as local exchange carriers (LECs). A connection between two local exchanges within the LATA is referred to as intraLATA. A connection between a carrier in one LATA to a carrier in another LATA is referred to as interLATA. Because of increased competition and regulatory mandate, it has become increasingly important to preserve a subscriber's billing and IXC preferences for each call originated by the subscriber.

When a calling party picks up a telephone on a subscriber's line and dials a directory number, the subscriber's line carries the communication to a central office switch, or service switching point (SSP), that services the subscriber's line. The central office switch interprets the digits dialed by the calling party and routes the communication to a terminating station, such as a telephone associated with the dialed directory number. The central office switch thus serves as a gateway between the subscriber's line and the local exchange carrier's local exchange network. The central office switch also serves as a gateway between the subscriber's line and a plurality of long distance networks operated by a plurality of long distance carriers.

When the central office switch receives a long distance communication originating on the subscriber's line, the central office switch retrieves the subscriber's long distance carrier-of-record code from a database maintained at the central office switch. Typically, the central office switch responds to the subscriber's long distance carrier-of-record code by physically routing the communication through the long distance network operated by the long distance carrier-of-record.

However, this process is not as simple when the subscriber wishes to activate certain types of assistance, such as voice activated dialing or outgoing call screening, when originating a call. Typically, the service circuit node (SCN) where the assistance is activated would complete the call to the called party and bridge the subscriber and the called party, but this would not preserve subscriber preferences because the outbound leg is originating with the SCN and not the subscriber. Therefore, there is a need for a method and system of call origination, where certain types of assistance are required, that preserves subscriber billing and IXC preferences.

SUMMARY OF THE INVENTION

The present invention satisfies the above-described needs by providing a method and system of call origination on behalf of a subscriber using a service circuit node (SCN) in an Advanced Intelligent Network (AIN). Generally described, in an embodiment of the present invention, an SCN provides assistance in the origination of a call on behalf of a subscriber. The exact form of the assistance is not particularly significant to the present invention, but examples are given below. Upon completion of the assistance provided by the SCN, the SCN will attempt to originate a call to a third party on behalf of the subscriber. Advantageously, this invention preserves subscriber preferences for certain attributes including interexchange carrier (IXC) and billing information, without the need for data replication within either the SCN or the service switching point (SSP) hosting the SCN.

In an embodiment, the present invention provides a method and system for call origination using an SCN in the AIN connected to the PSTN. This invention includes the provision of certain types of assistance required in originating a call from a subscriber to a third party. The form of assistance may include, but is not limited to, voice activated dialing, outgoing call screening, or conference call services. One manner in which the subscriber may access the assistance is by dialing a feature code such as *TALK or #411.

In an embodiment, a subscriber places a call to a third party. The subscriber activates the phone, for example, by taking it off hook. Upon encountering such a trigger, the SSP serving the subscriber sends a message to the SCP serving the subscriber. Service logic in the SCP will result in the SCP instructing the SSP to route the call to the SCN. This action triggers service logic within the SCN, and upon completion of the service logic, the SCN will attempt to originate a call. The SCN will originate a call with the subscriber as the "virtual called party" and the third party as the "virtual calling party."

The call is then routed back to the SSP serving the subscriber. Upon arriving at the SSP serving the subscriber, the outbound leg will encounter a termination attempt trigger (TAT). Service logic in an SCP will examine the parameters associated with this call leg and determine whether the originator of the call leg is a known SCN. The SCP will respond with a forward call message specifying the third party as the "actual called party" and the subscriber as the "actual calling party." Significant aspects of this embodiment include the preservation of subscriber billing and PIC information as a result of the call forwarding operation and the use of a TAT and call forwarding as part of a method of call origination.

These and other objects, features, and advantages of the present invention may be more clearly understood and appreciated from a review of the following detailed description of the disclosed embodiments and by reference to the appended drawings.

BRIEF DESCRIPTION OF THE DRAWINGS

FIG. 3 is a flow diagram illustrating an exemplary method of operation of the present invention.

DETAILED DESCRIPTION OF THE INVENTION

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
|---------|------------|
| AIN | Advanced Intelligent Network |
| BRI | Basic Rate Interface |
| DTMF | Dual Tone Multi-Frequency |
| FCF | Flexible Call Forwarding |
| GR-1129 | Generic Requirements 1129 |
| IP | Intelligent Peripheral |
| ISDN | Integrated Service Digital Network |
| IXC | Interexchange Carrier |
| LATA | Local Access and Transport Area |
| LEC | Local Exchange Carrier |
| PIC | Preferred Interexchange Carrier |
| PRI | Primary Rate Interface |
| PSTN | Public Switched Telephone Network |
| SCN | Service Circuit Node |
| SCP | Service Control Point |
| SMS | Service Management System |
| SPA | Service Package Application |
| SS7 | Signaling System 7 |
| SSP | Service Switching Point |
| STP | Signal Transfer Point |
| TAT | Termination Attempt Trigger |
| TCAP | Transaction Capabilities Application Part |
| VAD | Voice Activated Dialing |

Figure 1:
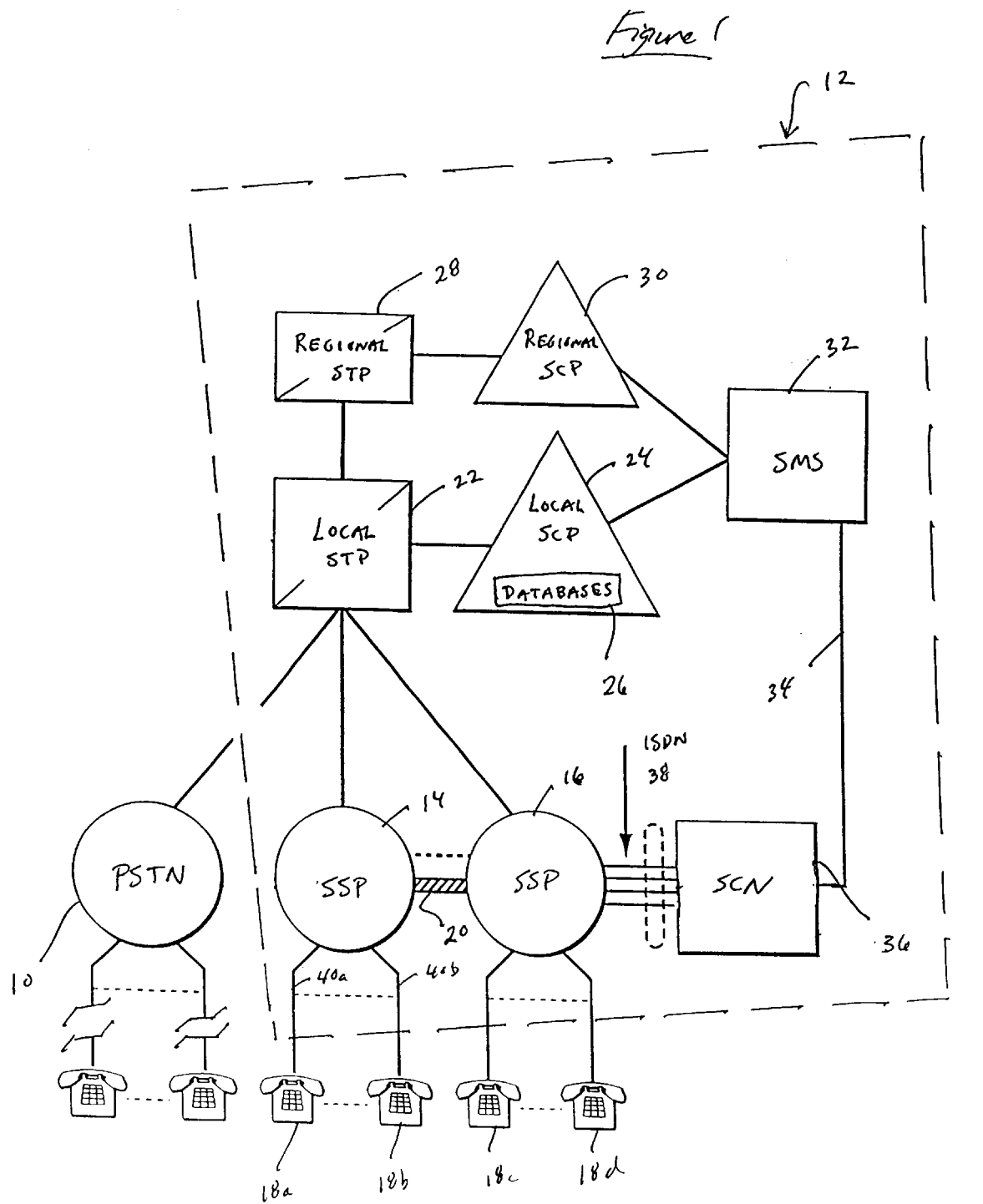
FIG. 1 illustrates an exemplary environment and a block diagram of an exemplary embodiment of the present invention.

Exemplary Environment As Used with Exemplary Embodiments—FIG. 1

FIG. 1 is a diagram of an exemplary embodiment and exemplary environment for operation of the methods and system of the present invention. Connected to a public switched telephone network (PSTN) 10, an exemplary environment is an Advanced Intelligent Network (AIN) 12. For brevity, only a basic explanation of AIN 12 is provided. Where AIN 12 operates or is composed differently in an important aspect from that which would be understood by those skilled in the art, additional details are provided herein. For further information regarding the referenced AIN 12 and aspects thereof, the interested reader is referred to the commonly assigned patent to Weisser, U.S. Pat. No. 5,430,719, which is incorporated herein by reference.

AIN 12 includes a variety of interconnected network elements. A group of such network elements includes the plurality of central offices which are indicated as service switching points (SSPs) 14 and 16 in FIG. 1. An SSP typically includes switch functionality, but also includes other functionality so as to communicate with other AIN elements as those skilled in the art understand. As further illustrated in FIG. 1, SSPs 14 and 16 have a plurality of subscriber lines, or calling lines, connected thereto. Each SSP serves a designated group of calling lines, and thus, the SSP that serves a particular calling line may be referred to as its serving SSP. For example, SSP 14 serves calling lines 40a and 40b. Each calling line is connected typically to a piece of terminating equipment including a plurality of telephones individually referenced as 18a, 18b, 18c, and 18d. Although telephones are illustrated as the pieces of terminating equipment in FIG. 1, those skilled in the art will understand that such pieces include other telecommunication devices such as facsimile machines, computers, modems, etc.

Pursuant to a preferred embodiment, each active calling line in an AIN is assigned a multi-digit calling line number. In the U.S., the calling line number typically consists of ten digits. In the description of the present invention, the term "calling line number" is used in its generally understood meaning to be the number which is dialed or input by a caller or source and used by the network to route the communication so as to reach a piece of terminating equipment on a calling line associated with the dialed calling line number. A calling line number is commonly referred to as a telephone number or a directory number.

SSPs 14 and 16 are interconnected by a plurality of trunk circuits 20. These are the voice path trunks that interconnect the SSPs to connect communications. The term "communication" or "call" is used herein to include all messages that may be exchanged between a caller (or calling party or originating party or subscriber) and a third party or called party or destination in the network illustrated in FIG. 1.

Each of SSPs 14 and 16 is connected to another type of AIN element referred to as a local signal transfer point (STP) 22 via respective data links using the Signaling System 7 (SS7) protocol, which is well known in the art. Much of the intelligence of the AIN resides in yet another type of AIN element referred to as a local service control point (SCP) 24 that is connected to STP 22 over an SS7 data link. Among the functions performed by SCP 24 are the maintenance of network databases and subscriber databases as represented collectively by databases 26. Databases 26 may be used in providing telecommunication services to a subscriber. Typically, SCP 24 includes service package applications (SPAs) that are used in connection with or as part of databases 26 in the application of telecommunication services or enhanced features to calling lines.

The local STP 22 may be connected to other network elements of AIN 12 through a regional STP 28, which in turn may be connected to a regional SCP 30. Both regional SCP 30 and local SCP 24 are connected via respective data links to a service management system (SMS) 32. SMS 32 interfaces to business offices of the local exchange carrier (LEC) and interexchange carriers (IXCs).

In order to keep the processing of data and calls as simple as possible, a relatively small set of triggers is defined at the SSPs for each call. In the exemplary environment, there are three types of triggers: subscribed (line), group, and office. With regard to the present invention, a trigger in the AIN is an event associated with a particular calling line (i.e., subscribed) that generates a packet to be sent to an SCP. The trigger causes the SCP to query its databases or service package applications for processing instructions with respect to the particular call. The results are sent back to the SSP in a response from SCP 24 through STP 22. The return packet includes instructions to the SSP as to how to process the call. The instructions may be to take some special action as a result of a customized calling service or enhanced feature. In response, the SSP moves through its call states, collects the called digits, and generates further packets that are used to set up and route the call. Similar devices for routing calls among various local exchange carriers are provided by regional STP 28 and regional SCP 30.

SMS 32 also is connected via a data link 34 to one or more intelligent peripherals (IPs) or service circuit nodes such as the illustrated service circuit node (SCN) 36. In an exemplary environment, either or both of an intelligent peripheral and a service circuit node may be present, and one or more IPs or SCNs may be present. By this data link 34, SMS 32 provides SCN 36 with information relating to new subscribers and updates for existing subscribers, and with information relating to network operations such as new services, upgrades to existing services, measurements, audits, and maintenance. The SCN 36 that receives information from SMS 32 may be one of many kinds of elements used in telecommunication services. SCN 36 includes voice and dual tone multi-frequency (DTMF) signal recognition devices and voice synthesis devices. In addition, SCN 36 is connected to one or more (but usually only a few) SSPs via Integrated Service Digital Network (ISDN) links 38 as shown by the connection to SSP 16.

Figure 2:
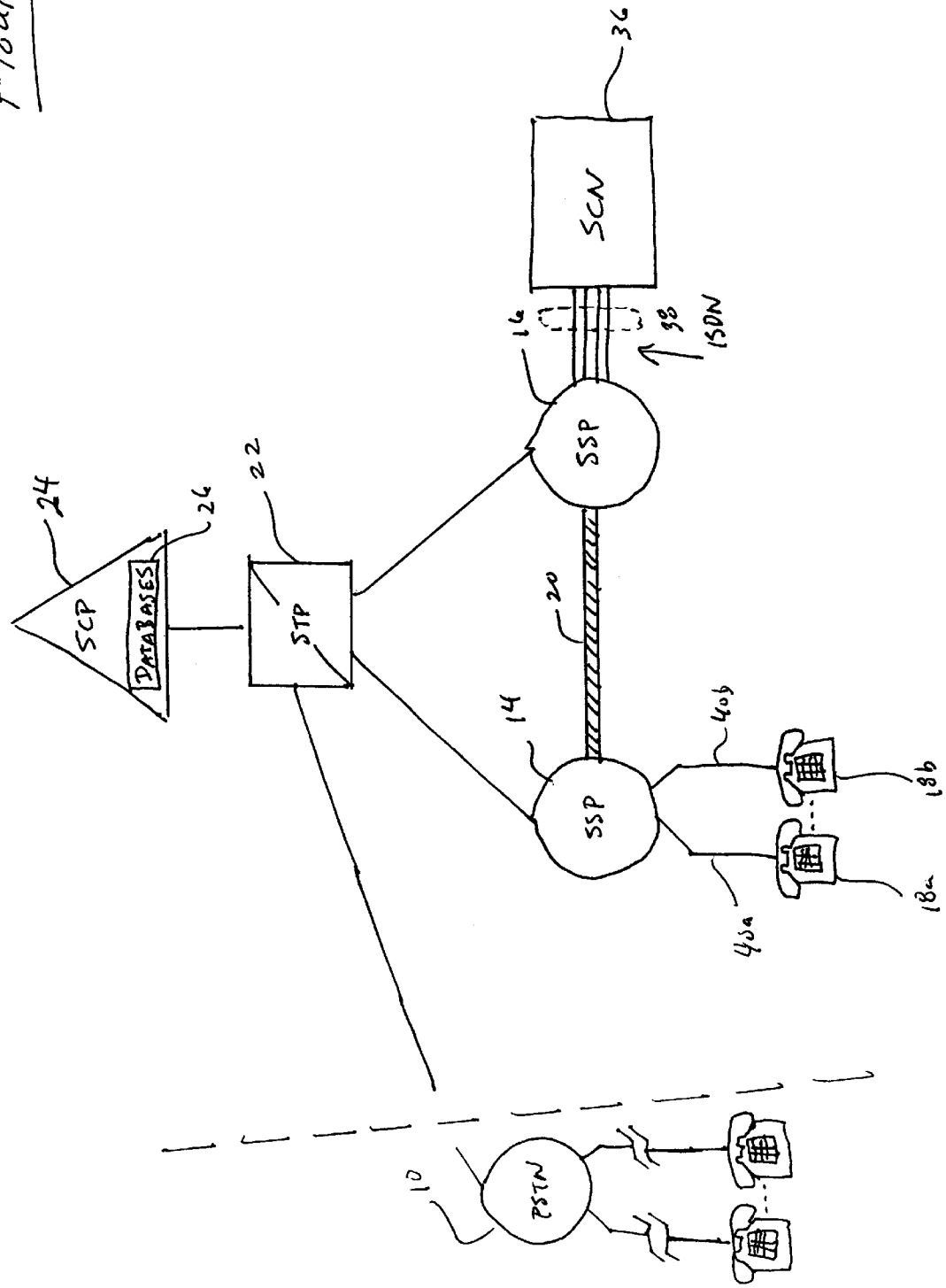
FIG. 2 is a block diagram of an exemplary embodiment operating in the exemplary environment in accordance with the present invention.

Method for Call Origination using Service Node Assistance—FIGS. 2 and 3

An exemplary method and system of call origination using service node assistance is shown in FIGS. 2 and 3. The inventive system and method include the provision of certain types of assistance required in originating a call from a subscriber to a third party using a service circuit node (SCN), or other intelligent peripheral. The precise form of assistance, such as voice activated dialing, outgoing call screening, outbound call recording, or use of conference call resources, is not particularly critical to the present invention. One manner in which the subscriber may access the assistance is by dialing a feature code such as *TALK or #411. In another embodiment, the SCP serving the subscriber may examine a feature list associated with the subscriber and prompt the subscriber to choose a form of assistance.

This invention allows for the preservation of subscriber preferences, such as billing and IXC information, without the need for data replication or complex logic within either the SCN or the SSP hosting the SCN. The basic system architecture was described above with reference to FIG. 1. Additionally, there is a PRI trunk group terminating on SCN 36. A BRI (Basic Rate Interface) could be used rather than a PRI. Use of a BRI would require a different means of originating the call from the SCN than that described below for the exemplary embodiment, which is understood by those skilled in the art. Each subscriber has a call model within the SSP, wherein each call model has a finite set of states that a call goes through. One of the trigger points is off hook, when a caller picks up the receiver to initiate a telephone call.

Referring to FIG. 2 and describing this invention by way of example, the subscriber picks up telephone 18a. Upon detection of the originating trigger, off hook in this example, SSP 14 needs to obtain further instructions from other network elements. SSP 14 sends an SS-7 Transaction Capabilities Application Part (TCAP) message to SCP 24 via STP 22 to request instructions. SCP 24 receives this request along with information about the subscriber associated with telephone 18a and calling line 40a, such as (1) the state of the call, (2) the subscriber's calling line number, and (3) that telephone 18a just went off hook. In response to the query by SSP 14, SCP 24 identifies the subscriber by performing a search of database 26. Completion of service logic in SCP 24 will result in SCP 24 instructing SSP 14 to route the call to SSP 16, the SSP serving SCN 36. The service logic in SCP 24 could relate to one or more enhanced services or features, and the exact types of service logic and enhanced services are not of particular significance to this invention. It is sufficient to note that the service logic is related to some form of assistance provided to the subscriber to originate communications, which is understood by those skilled in the art.

SSP 14 establishes a call path between telephone 18a and SSP 16, which then routes the communication to SCN 36. This action triggers service logic within SCN 36. Again, the service logic present in SCN 36 is not particularly significant to the present invention, and many variations of service logic may be used as is understood by those skilled in the art. Upon completion of the service logic, SCN 36 will attempt to originate a call. In this example, the third party associated with telephone 18b and calling line 40b is the party that the subscriber desires to reach. Typically, SCN 36 would specify the third party as the "actual called party." However, according to the present invention, the subscriber, at calling line 40a, who originates the call is specified as the "virtual called party" and the call is re-originated by the SCN and proceeds as follows.

SCN 36 originates a call with the subscriber as the "virtual called party" and the third party associated with telephone 18b as the "virtual calling party." SSP 16 then routes the call back to the subscriber home switch, SSP 14, where it will encounter a termination attempt trigger (TAT). In an AIN, a TAT is encountered unconditionally any time a call is presented to a subscribed line, which is understood by those skilled in the art. Upon encountering the TAT, SSP 14 will send a TCAP query containing an AIN Termination Attempt message to SCP 24 via STP 22. Service logic within SCP 24 will analyze the parameters included within the message. If the originator of the call leg (SCN 36, in this example) corresponds to a known SCN, SCP 24 will respond to SSP 14 with a TCAP response message containing an AIN Forward Call message populated as follows: "actual called party"=third party (at 18b), "actual calling party"= subscriber (at 18a). Otherwise, SCP 24 will send a TCAP response message containing an AIN Authorize Termination message and the call will be terminated. SCP 24 may determine whether the originator of the call leg corresponds to a known SCN in a number of ways, which is understood by those skilled in the art. As one example, SCP 24 may maintain a table of directory numbers associated with "known SCNs." Upon receipt of a query, certain call parameters are used by the SCP to perform a look-up in this table to determine whether there is a matching entry. If a matching entry is found, then the call is assumed to have originated from a known SCN.

Preferences for billing and IXC will be picked up from telephone 18a and calling line 40a of the subscriber as a result of forwarding the call. This occurs because the back leg of the call now appears to have been re-originated and therefore picks up the subscriber's IXC and billing preferences, and the call is completed to the third party at telephone 18b by SSP 14. It is the responsibility of SCN 36 to connect the inbound and outbound legs of the call. Once the call is set up, SCN 36 can bridge the call back through the SSP serving the calling party (SSP 14) and SCN 36 drops out of the call, saving resources. One example of a mechanism for bridging the call is an ISDN B-Channel Transfer.

While it is possible for the SCN to establish the outbound leg directly to the third party at telephone 18b, doing so bypasses any preferences of the subscriber (at 18a) for IXC and billing information. Only by making the call appear to originate from the calling line of the subscriber is such information preserved. Significant aspects of this embodiment of the invention include the use of a TAT and call forwarding as part of a method of call origination and the preservation of subscriber billing and IXC preferences. Furthermore, the present embodiment does not require the deployment of GR-1129 capabilities within the AIN.

GR-1129 is a specification of the interface between a Service Switching Point and an Intelligent Peripheral or Service Circuit Node. GR-1129 provides a more formally-defined and feature rich way of providing voice service circuit access to applications running on an SCP. The disadvantage of GR-1129 is that it requires new capabilities to be implemented on the SSP. Generally, a network provider wishing to implement GR-1129 must purchase those features from the SSP vendor at a relatively high price. Because the present invention does not require the capabilities of GR-1129, the invention can be deployed by network providers that do not wish to purchase GR-1129 features for their networks. More information on GR-1129 is available in Bellcore, "AINGR: Switch—Intelligent Peripheral Interface," GR-1129-CORE, Issue 3, Revision 1, October 1998, said document being incorporated herein by reference in its entirety.

Although FIG. 2, and other exemplary environments and embodiments discussed herein, show telephones 18a and 18b (and calling lines 40a and 40b) being served by the same SSP, one skilled in the art would understand that these pieces of terminating equipment (and calling lines) could be served by different SSPs. Likewise, SCN 36 and telephone 18a could be served by the same SSP, or telephones 18a and 18b and SCN 36 could all be served by the same SSP or each by a different SSP.

Referring to FIG. 3, an exemplary method of operation by which a communication is originated from a calling party is described using a flow diagram. The process begins at the Start step 100, and in step 105, an originating trigger associated with a calling line is received in connection with a communication. Off hook is a typical originating trigger that occurs when a calling party lifts a phone receiver, in this example telephone 18a and calling line 40a shown in FIG. 2. At step 110, SSP 14 queries SCP 24 via STP 22 to obtain instructions from SCP 24. SSP 14 provides SCP 24 with information relating to the communication as part of the SSP's query to SCP 24.

In response to the query provided by SSP 14, at step 115, SCP 24 identifies the subscriber by performing a search in database 26, which was previously described with respect to FIG. 2. At step 120, service logic within SCP 24 provides instructions to SSP 14 to route the communication to SSP 16, which then routes the communication to SCN 36. At step 125, service logic within SCN 36 is prompted upon receipt of the communication and upon completion of the service logic, SCN 36 attempts to originate a call. In this example, the third party that the subscriber is attempting to contact is associated with calling line 40b and telephone 18b.

At step 130, SCN 36 originates a call with the subscriber as the "virtual called party" and the third party as the "virtual calling party," and SCN 36 routes that call to SSP 14 via the SSP serving SCN 36, SSP 16. At step 135, SSP 14 encounters a TAT and sends a query to SCP 24, via STP 22, for instructions. SCP 24 determines whether the originator of the call leg, SCN 36 in this example, corresponds to a known SCN at step 140. If the originator of the call leg does not correspond to a known SCN, then the call is terminated at step 145. If the originator of the call leg does correspond to a known SCN, then SCP 24 responds to SSP 14 including a forward call message with the subscriber as "actual calling party" and the third party as the "actual called party" at step 150, and the call is routed to telephone 18b by SSP 14 at step 155. Accordingly, preferences for billing and IXC are collected from telephone 18a and calling line 40a of the subscriber as a result of forwarding the call. This occurs because the back leg of the call now appears to have been re-originated and therefore picks up the subscriber's IXC and billing preferences, and the call is completed to the third party at telephone 18b.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. In an advanced intelligent network, a method for originating a communication from a first calling line number utilizing an enhanced telecommunication service available to a subscriber using a public switched telephone network, comprising:

(A) encountering an originating trigger and querying a first network element to obtain instructions for routing the communication, wherein the first network element identifies the subscriber associated with the first calling line number;

(B) receiving instructions from the first network element for contacting a second network element, wherein the second network element executes service logic relating to the enhanced telecommunication service and, upon completion of the service logic, originates the communication with the subscriber as "virtual called party" and a third party associated with a second calling line number as "virtual calling party";

(C) encountering a termination attempt trigger and querying the first network element for instructions, wherein the first network element determines whether the second network element corresponds to a known network element;

(D) if the second network element corresponds to a known network element, receiving instructions from the first network element for routing the communication to the third party indicating the subscriber as "actual calling party" and the third party as "actual called party"; and (E) routing the communication to the third party.

2. The method of claim 1, wherein the first network element is a service control point serving the subscriber and the second network element is a service circuit node.

3. The method of claim 1, wherein the enhanced telecommunication service is selected from a group consisting of voice activated dialing, outgoing call screening, and outbound call recording.

4. The method of claim 1, further comprising terminating the communication if the second network element does not correspond to a known network element.

5. The method of claim 1, wherein determining whether the second network element corresponds to a known network element comprises searching a table of directory numbers associated with a plurality of known network elements for an entry that matches the second network element.

6. In an advanced intelligent network, a system for originating a communication from a first calling line number utilizing an enhanced telecommunication service available to a subscriber using a public switch telephone network, comprising:

(A) a first network element being operative to identify the subscriber associated with the first calling line number;

(B) in connection with the identification, the first network element being operative to instruct a second network element to contact a third network element;

(C) the third network element being operative to execute service logic relating to the enhanced telecommunication service and, upon completion of the service logic, to originate the communication with the subscriber as "virtual called party" and a third party associated with a second calling line number as "virtual calling party";

(D) upon encountering a termination attempt trigger, the second network element being operative to query the first network element for instructions to route the communication;

(E) upon receiving the query, the first network element being operative to determine whether the third network element corresponds to a known network element; and (F) if the third network element corresponds to a known network element, the first network element being operative to instruct the second network element to route the communication to the third party with the subscriber as "actual calling party" and the third party as "actual called party".

7. The system of claim 6, further comprising the first network element being operative to analyze a call from the subscriber that is directed to a feature code for the enhanced telecommunication service.

8. The system of claim 6, further comprising the first network element being operative to analyze a feature list of the subscriber to determine the enhanced telecommunication service.

9. The system of claim 6, further comprising the first network element being operative to terminate the communication if the third network element does not correspond to a known network element.

10. The system of claim 6, wherein the fist network element is a service control point serving the calling line, the second network element is a service switching point servicing the calling line, and the third network element is a service circuit node.

11. The system of claim 6, wherein the enhanced telecommunication service is selected from a group consisting of voice activated dialing, outgoing call screening, and outbound call recording.

12. The system of claim 6, further comprising the first network element being operative to search a table of directory numbers associated with a plurality of known network elements for an entry that matches the third network element.

13. In an advanced intelligent network, a method for preserving billing and interexchange carrier preferences of a subscriber with respect to originating a communication from a first calling line number utilizing an enhanced telecommunication service available to the subscriber, comprising:

(A) receiving an indication that the subscriber associated with the first calling line number is subscribed to the enhanced telecommunication service (B) executing service logic relating to the enhanced telecommunication service and, upon completion of the service logic, originating the communication with the subscriber as "virtual called party" and a third party associated with a second calling line number as "virtual calling party";

(C) upon routing the communication to the subscriber, encountering a termination attempt trigger that requires a determination as to whether a first network element responsible for originating the communication corresponds to a known network element;

(D) if the first network element corresponds to a known network element, sending instructions for routing the communication to the third party indicating the subscriber as "actual calling party" and the third party as "actual called party"; and (E) routing the communication to the third party.

14. The method of claim 13, wherein step A further comprises receiving a communication from the subscriber that is directed to a feature code for the enhanced telecommunication service.

15. The method of claim 13, wherein step A further comprises analyzing a feature list of the subscriber.

16. The method of claim 13, further comprising terminating the communication if the first network element does not correspond to a known network element.

17. The method of claim 13, wherein the first network element is a service circuit node.

18. The method of claim 13, wherein determining whether the first network element corresponds to a known network element comprises searching a table of directory numbers associated with a plurality of known network elements for an entry that matches the first network element.

19. The method of claim 13, wherein the enhanced telecommunication service is selected from a group consisting of voice activated dialing, outgoing call screening, and outbound call recording.

20. The method of claim 1, wherein identifying the subscriber associated with the first calling line number comprises performing a search of a database.

* * * * *

UNITED STATES PATENT AND TRADEMARK OFFICE
CERTIFICATE OF CORRECTION

PATENT NO. : 6,813,348 B1
DATED : November 2, 2004
INVENTOR(S) : Stillman et al.

It is certified that error appears in the above-identified patent and that said Letters Patent is hereby corrected as shown below:

Column 10,
Line 3, "the fist network" should read -- the first network --

Signed and Sealed this

Fifth Day of April, 2005

JON W. DUDAS
*Director of the United States Patent and Trademark Office*